US008559546B2

(12) United States Patent
Leyonhjelm et al.

(10) Patent No.: US 8,559,546 B2
(45) Date of Patent: Oct. 15, 2013

(54) METHODS AND AN APPARATUS FOR ESTIMATING A RESIDUAL FREQUENCY ERROR IN A COMUNICATIONS SYSTEM

(75) Inventors: Scott Leyonhjelm, Moonee Ponds (AU);
Melvyn Pereira, Mordialloc (AU);
Aaron Reid, Wellington (NZ)

(73) Assignee: Samsung Electronics Co., Ltd (KR)

( * ) Notice: Subject to any disclaimer, the term of this patent is extended or adjusted under 35 U.S.C. 154(b) by 262 days.

(21) Appl. No.: 12/993,394

(22) PCT Filed: May 19, 2008

(86) PCT No.: PCT/SE2008/050583
§ 371 (c)(1),
(2), (4) Date: Nov. 18, 2010

(87) PCT Pub. No.: WO2009/142557
PCT Pub. Date: Nov. 26, 2009

(65) Prior Publication Data
US 2011/0064175 A1    Mar. 17, 2011

(51) Int. Cl.
*H04L 1/06* (2006.01)
(52) U.S. Cl.
USPC ........................................................ 375/276
(58) Field of Classification Search
USPC ......... 375/147, 148, 260, 262, 265, 267, 340, 375/343; 370/208, 210
See application file for complete search history.

(56) References Cited

U.S. PATENT DOCUMENTS

| | | | |
|---|---|---|---|
| 5,073,907 A | | 12/1991 | Thomas, Jr. |
| 2004/0161047 A1* | | 8/2004 | Liu et al. ................. 375/260 |
| 2004/0196915 A1 | | 10/2004 | Gupta |
| 2005/0272374 A1* | | 12/2005 | Lewis ..................... 455/67.11 |
| 2006/0209979 A1* | | 9/2006 | Sandell et al. ............ 375/267 |
| 2007/0041456 A1 | | 2/2007 | Jahan et al. |
| 2007/0098091 A1 | | 5/2007 | Hou |

OTHER PUBLICATIONS

Jeil Jo, et al; "Residual Frequency Offset Compensation for IEEE 802.11a", IEEE, Sep. 26-29, 2004, abstract, Section IV, pp. 2201-2204.
Yong-Hwa Kim, et al; "Joint Common Phase Error and Channel Estimation for OFDM-based WLANs in the Presence of Wiener Phase Noise and Residual Frequency Offset", IEEE, Jun. 2006, abstract, Section III B, pp. 3040-3045.
International Search Report: PCT/SE2008/050583, Apr. 1, 2009.

(Continued)

*Primary Examiner* — Young T. Tse
(74) *Attorney, Agent, or Firm* — The Farrell Law Firm, P.C.

(57) ABSTRACT

The present invention relates to methods and an apparatus for estimating a residual frequency error. According to an embodiment, an expected vector for selected subcarriers of a received symbol is estimated using a channel estimate vector and a reference vector; a sampling frequency mismatch is removed and a dot product is calculated using the expected and a received vector. An angle of the product is estimated and a change in angle from a previous symbol is calculated. The residual frequency is estimated using the calculated change in angle. In another embodiment, an expected subcarrier is estimated based on a channel estimate and on a reference subcarrier, an angle and magnitude of the multiplication between the expected and a received subcarrier are estimated; a phase offset is removed; a weighted mean value of the angles is calculated and the residual frequency error is estimated using a change in weighted mean angle.

25 Claims, 7 Drawing Sheets

(56) References Cited

OTHER PUBLICATIONS

Juha Heiskala, et al; "OFDM Wireless LANs: A Theoretical and Practical Guide" Paperback Book, Publication Date: 2001; Published by Sams Indianapolos, IN, USA; ISBN:0672321572; 315 pages.

V.S. Abhayawardhana, et al; "Residual Frequency Offset Correction for Coherently Modulated OFDM Systems in Wireless Communication", Paper Appears in: IEEE 55$^{th}$ Conference Vehicular Technology, 2002, VTC Spring 2001, pp. 777-781 vol. 2.

Maja Sliskovic; "Sampling Frequency Offset Estimation and Correction in OFDM Systems", Global Telecommunications Conference, 2001. GLOBECOM '01. IEEE, vol. 1, pp. 285-289, San Antonio, TX.

Thierry Pollet, et al; "The BER Performance of OFDM Systems using Non-Synchronized Sampling", Global Telecommunications Conference, 1994. GLOBECOM '94. Communications: The Global Bridge., IEEE; Issue Date: Nov. 28-Dec. 2, 1994; pp. 253-257, vol. 1; Meeting Date: Nov. 28, 1994-Dec. 2, 1994, San Francisco CA USA.

Lajos L. Hanzo, et al; "OFDM and MC-CDMA for Broadband Multi-User communications, WLANs and Broadcasting", Sep. 19, 2003, Wiley-IEEE Press, England, XP002686296, ISBN: 0470858796, pp. 124-128, paragraph [5.1.2] paragraph [5.1.2.1.1].

European Search Report: dated Nov. 19, 2012; Appln. No. 08753992.0-1525 / 2289216 PCT/SE2008050583.

Richard van Nee, "The 802.11n MIMO-OFDM Standard", Emerging Technologies in Wireless LANs, Nov. 5, 2007.

J.Y. Stein, "Digital Signal Processing: A Computer Science Perspective", Telecommunications and Signal Processing, Oct. 9, 2000.

\* cited by examiner

METHODS AND AN APPARATUS FOR ESTIMATING A RESIDUAL FREQUENCY ERROR IN A COMUNICATIONS SYSTEM

TECHNICAL FIELD OF THE INVENTION

The present invention relates generally to the field of digital communication systems, and more particularly to methods and an apparatus for estimating a residual frequency error in a communications system.

BACKGROUND OF THE INVENTION

One of the principle drawbacks of multicarrier digital and/or analogue communication systems such as wired, wireless and optical systems is their sensitivity to frequency and sampling frequency synchronizations errors. A frequency offset or a frequency mismatch between a transmitter and a receiver usually results in a frequency offset prior to a received signal being demodulated. In e.g. orthogonal frequency division multiplexing (OFDM) systems, the frequency mismatch increases inter-carrier interference (ICI) and additionally a constant phase rotation is introduced for every symbol received. This impairment results in degraded performance of the receiver. In a publication by Pollet et al entitled: "*The BER Performance of OFDM Systems using Non-Synchronised Sampling*", IEEE Global Telecommunications Conference 1994, pp 253-257, it is shown that a 1% frequency mismatch, relative to the subcarrier spacing in an OFDM symbol, can be tolerated for a negligible 0.5 dB loss in 64 QAM (quadrature amplitude modulation), whereas QPSK (quadrature phase shift keying) modulation can tolerate up to a 5% error, and as such requires a tracking of sampling frequency offset. A frequency offset also results in degradation of the performance of a DC (direct current) offset and time synchronizer algorithms at the receiver. Furthermore, degradation of an estimation of a channel via which signals are received, is experienced especially in systems where multiple signals or multiple symbols are combined together to produce a channel estimate e.g. space time block coding (STBC), spatial division multiplexing (SDM) and multiple input multiple output (MIMO) systems.

As mentioned earlier, multicarrier systems are also sensitive to a sampling frequency error or mismatch between a transmitter and a receiver. In e.g. OFDM systems, mismatch in sampling frequencies between a transmitter and a receiver can lead to the loss of orthogonality between subcarriers which results in an increase in ICI. Additionally, an increasing phase rotation is introduced which increases proportionally as the subcarrier frequency increases (i.e. the outer subcarriers are affected more than the inner subcarriers) and also as consecutive OFDM symbols are received. This impairment continues to increase until the receiver can no longer correctly decode the received signal, and as such requires the tracking of the sampling frequency offset. In a publication by Heiskala & Terry, entitled: "*OFDM Wireless LANS: theoretical and practical guide*", Chapter 2, SAMS, December 2001, it has been shown that for very long OFDM packets, a sampling frequency mismatch can advance or retard the optimal time synchronization point by an integer sample period or more.

The frequency mismatch and the sampling frequency mismatch between a transmitter and a receiver can be estimated by existing synchronisation algorithms suggested in the above cited publication. As an example, a frequency mismatch can be estimated based on known training information embedded into the transmitted signal e.g. a preamble and pilot subcarriers or based on analyzing the received signal or based on inherent characteristics of a received signal e.g. a cyclic prefix in case of a received OFDM signal.

However, in actual implementation, the estimated frequency offset does not generally equal the actual frequency error because of the influence of noise and analog impairment components between the transmitter and the receiver on the estimation algorithms. Therefore, a residual frequency error, which is defined as the difference between the estimated frequency error and the actual frequency error, exists. The presence of the residual frequency error will affect system performance in terms of a reduction in the signal to noise ratio of the receiver and a rotation of a constellation. The constellation rotation is related to the residual frequency error according to the following approximation: Constellation Rotation per symbol$\approx 360 \times f_{residual} \times T_s$ (degrees), where $T_s$ is the period of e.g. an OFDM symbol. Higher order modulations, such as 64 QAM, are particularly sensitive to the constellation rotation as the subcarrier constellation ends up being rotated over the decision boundaries and hence correct demodulation becomes more difficult. The residual frequency error can also be significant for lower order modulations that have longer packet lengths. Long packet lengths allow the constellation to progressively rotate over time, until the subcarrier constellation is eventually rotated across the decision boundary, making correct demodulation more difficult.

In the prior art, the amount (or accuracy) of the residual frequency mismatch usually depends on the algorithm employed. An example of such prior art can be found in a publication by V. S. Abhayawardhana et al, "*Residual Frequency Offset Correction for Coherently Modulated OFDM systems in Wireless Communication*", Vehicular Technology Conference, 2002. VTC Spring 2002. IEEE 55th, Volume 2, 6-9 May 2002 Page(s):777-781 vol. In this prior art, a residual frequency correction algorithm is used to continuously track and compensate for the residual frequency error that is present after an acquisition of an estimate of the frequency offset using another algorithm known as the Schmidl and Cox Algorithm (SCA). The residual frequency error is estimated by tracking the rate of phase change at the output of a frequency domain equalizer (FEQ) following the fast Fourier transform (FFT) operation. However, the estimate of the residual frequency error can be seriously affected by subchannels with a low SNR resulting from spectral nulls in the channel response. Therefore, a threshold is, in this prior art, introduced to select subchannels with a magnitude that is higher than the threshold. Thus not all the available information is being used and as such the performance is will be degraded dependent on the level of the threshold chosen. This prior art therefore can be said to suffer from a threshold effect.

In another technique described in M Sliskovic: "*Sampling Frequency Offset Estimation and Correction in OFDM systems*", The 8th IEEE International Conference on Electronics, Circuits and Systems, 2001. Volume 1, 2-5 Sep. 2001 Page (s):437-440, the phase difference between successive symbols is used to estimate the frequency offset, which can equally be used to estimate the residual frequency error. The proposed technique involves repetition of data symbols and comparison of the phases between successive repeated symbols on all subcarriers. In this prior art, when the phase difference is small (less than 1 degree), then an arg (or arctan) function can be approximated by a linear function, e.g. $\alpha$=arg (a+jb)=arctan(b/a)$\approx$b/a or sin(2$\pi$x)$\approx$2$\pi$x The problem with utilising such an approximation is that as the angle gets larger the approximation becomes worse, and the result will lead to poorer quality residual frequency estimate, which will mean that the correction applied will be in error. This is significant for 64 QAM constellations where an error in the order of degrees will degrade the receiver performance. Additionally the angle is not constrained to small angles (it can be shown to lie anywhere between 0 and 360 degrees) since it is dependent on the channel model (SNR and delay spread) and the amount of impairments in the system (phase noise, phase and amplitude imbalance, DC offset, crystal tolerance etc) and as such the small angle approximation leads to an incorrect estimation and correction which will lead to degraded performance of the receiver. The prior art also introduces a technique to avoid the threshold effect, by weighting the phase errors of each subcarrier by a value proportional to the SNR. The SNR of each subcarrier can be estimated by the square of the channel estimate denoted here $\hat{H}\hat{H}^*$. However, at low SNR the square of the channel estimate is not accurate.

In the above mentioned prior art, an approximation has been made where the sampling frequency offset is assumed to be zero. In non-flat fading channels or flat fading channels where the subcarriers used are not symmetrical, such an approximation will mean that the phase estimate will contain an additional error component caused by neglecting the sampling frequency offset.

SUMMARY OF THE INVENTION

It is therefore an object of the present invention to address the needs above, as well as other needs by providing methods and an apparatus for estimating a residual frequency error in a communication OFDM system.

According to a first aspect of the present invention, the above stated problem is solved by means of a method for estimating a residual frequency error between signals transmitted via a channel and received signals. The method comprises the following steps: estimating, for selected subcarriers of a symbol of the received signal, an expected vector based on a channel estimate vector and on a reference vector; removing, by phase rotation, a sampling frequency mismatch; calculating a dot product of the estimated expected vector and a received vector; estimating an angle of the resulting dot product; calculating a change in angle from a previous symbol; and estimating a residual frequency error using the change in angle from the previous symbol.

According to another aspect of the present invention, the above stated problem is solved by means of another method for estimating a residual frequency error between signals transmitted via a channel and received signals. The method comprises the following steps: estimating, for each selected subcarrier of a symbol of the received signal, an expected subcarrier based on a channel estimate of the subcarrier and on a reference subcarrier; multiplying in the complex plane, for each subcarrier, the estimated expected subcarrier and a received subcarrier, estimating, for each subcarrier, an angle and magnitude of the multiplication performed in the preceding step; removing, for each subcarrier, a phase offset caused by a sampling frequency mismatch; calculating a weighted mean value of the estimated angles; calculating a change in weighted mean angle from a previous symbol; and estimating a residual frequency error using the change in weighted mean angle from the previous symbol.

According to a further aspect of the present invention, the above stated problem is solved by means of an apparatus for estimating a residual frequency error, comprising means configured for carrying out at least, the method steps described above according to the first aspect and the second aspect of the present invention.

According to yet another aspect of the present invention, the above stated problem is solved by means of a communication OFDM system comprising the above mentioned apparatus in accordance with the present invention.

An advantage with the present invention is that the sampling frequency offset is not ignored when estimating a residual frequency error, and therefore an improvement in the receiver performance is achieved both in flat fading channels and in non-flat fading channels.

Another advantage with the present invention is that the estimation of a residual frequency error according to the present invention, does not suffer from a threshold effect, rather subcarriers phase difference estimates are instead effectively weighted with the term including the actual and estimated channel $H\hat{H}^*$ rather than the channel estimate squared $\hat{H}\hat{H}^*$. In addition, the estimation of a residual frequency error, according to the present invention, is not restricted to small phases i.e. an improvement in accuracy and stability is achieved since an accurate phase estimate of the angle can take any value between 0 and 360 degrees, not just when it is small.

The present invention will now be described in more detail by means of various embodiments and with reference to the accompanying drawings. Other features, objects and advantages will also become apparent from the description, the drawings and the appended claims, attention to be called to the fact, however, that the following drawings are illustrative only, and that changes may be made in the specific embodiments illustrated and described within the scope of the appended claims.

DETAILED DESCRIPTION OF THE INVENTION

The invention is described in a general context in relation to multicarrier communication systems such as OFDM (Orthogonal Frequency Division Multiplexing) based systems for communicating data. By way of example, the present invention may be applied to WLAN (Wireless Local Area Network) systems, IEEE 802.11 (Institute of Electrical and Electronics Engineers) systems WiFi (Wireless Fidelity), WiMAX (Worldwide Interoperability for Microwave Access) systems, ADSL (Asymmetric Digital Subscriber Line) systems or any other system that is based on OFDM.

Figure 1:
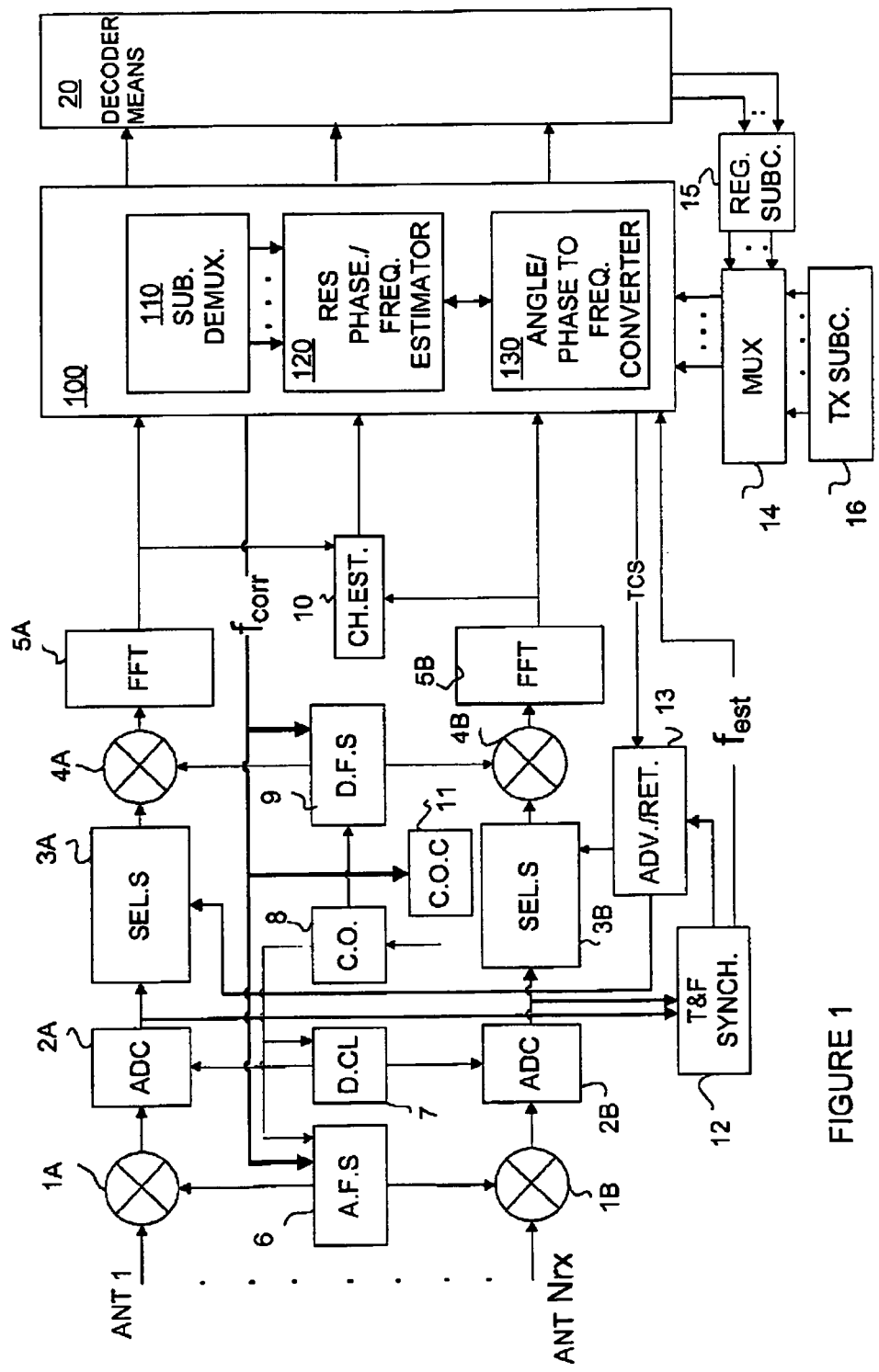
FIG. 1 illustrates a block diagram of an exemplary MIMO OFDM receiver wherein embodiments of the present invention can be applied.

Referring to FIG. 1, there is illustrated a simplified block diagram of an exemplary MIMO OFDM receiver wherein the functionality relevant to the different exemplary embodiments of the present invention is explained. As shown, the MIMO receiver comprises multiple receiver branches wherein only two of them are shown. In FIG. 1, ANT 1 represents an antenna of a first receiver branch whereas ANT $N_{rx}$ represents an antenna of a $N^{th}$ receiver branch. Note that the value of $N_{rx}$ can take any integer value larger than or equal to 1. In FIG. 1, the first receiver branch further comprises a first frequency mixer 1A, to mix a signal modulated onto a RF carrier down to signal modulated around 0 Hz, known as a complex baseband signal. The complex baseband signal, consisting of in-phase and quadrature components, are then converted into the digital domain by an analogue to digital converter (ADC) 2A. It is well known that there are many other techniques to produce a digital complex baseband signal from a signal modulated on a RF carrier and that other components e.g. filters, amplifiers etc. are required to properly complete the task. The digital complex baseband signal then passes through a sample selector (SEL.S) 3A. The sample selector 3A is configured to remove the cyclic prefix (CP) of the received signal and either retards or advances the samples based on input from an advance/retard block (ADV./RET.) 13. These samples are then passed onto the FFT after a second frequency mixer 4A, which corrects for the frequency mismatch between the transmitter and receiver. Note that the order of the SEL.S 3A and second frequency mixer block 4A can be reversed. The sample and frequency corrected complex baseband signal is then processed by the FFT block 5A, which implements the function of conversion from the time to frequency domain. The $N^{th}$ receiver branch also comprises a first frequency mixer 1B, an ADC 2B, a sample selector (SEL.S) 3B, a second frequency mixer 4B and a FFT block 5B. The MIMO receiver of FIG. 1 further includes an analogue frequency synthesiser (A.F.S) 6, which synthesises a frequency(s) to be used in the first frequency mixer(s) 1A/1B, a digital clock (D.CL) 7, which provides a sampling clock to the ADCs 2A/2B, a crystal oscillator (C.O.) 8, which provides a reference frequency to the D.CL 7, A.F.S 6 and D.F.S 9, and a digital frequency synthesiser (D.F.S) 9, which synthesises a frequency to be used in the second frequency mixer(s) 4A/4B. A crystal oscillator controller (C.O.C) 11, is used to adjust the reference frequency output of the C.O 8. A channel estimator (CH.EST) 10 which performs the function of generating an estimate of the channel between the transmitter and the receiver and a time and frequency synchroniser (T&F SYNCH) 12 which performs the function of making an initial estimate of the start of the received packet and the frequency offset $f_{est}$ between the transmitter and receiver. The advance and retard block (ADV./RET.) 13 advances or retards the initial timing estimate of the start of the packet based on the Time Control Signal (TCS) generated by the apparatus 120 of the present invention. The receiver also comprises a multiplexer 14 configured to either select a known transmitted subcarrier (TX.SUBC.) 16 and/or a regenerated subcarrier (REG.SUBC.) 15. A subcarrier is regenerated by making decisions based on information on the received data subcarriers during a decoder means 20 and then regenerating the data subcarriers from that information. Block 100 comprising a subcarrier demultiplexer 110 which is configured to demultiplex received subcarriers from the FFT blocks, which are then sent to a decoder means 20 for enabling channel equalization, impairment correction, soft bit metric conversion function, forward error correction (FEC) decoder etc. The demultiplexer 110 is also configured to demultiplex received subcarriers that are required by apparatus 120 for estimating a residual frequency error as will be described later in conjunction with FIGS. 2 and 5 respectively. Block 100 further comprises a phase/angle-to-frequency converter 130 that is arranged to generate a total frequency estimate denoted $f_{corr}$ in FIG. 1. The total frequency estimate $f_{corr}$ is, as shown in FIG. 1, used as an input to the C.O.C 11, the A.F.S 6 and the D.F.S 9, and can be configured to be open loop, adjusted at the start of the packet only, or closed loop, updated during the ongoing reception of a packet. More details on how $f_{corr}$ is calculated is also described later.

Figure 2:
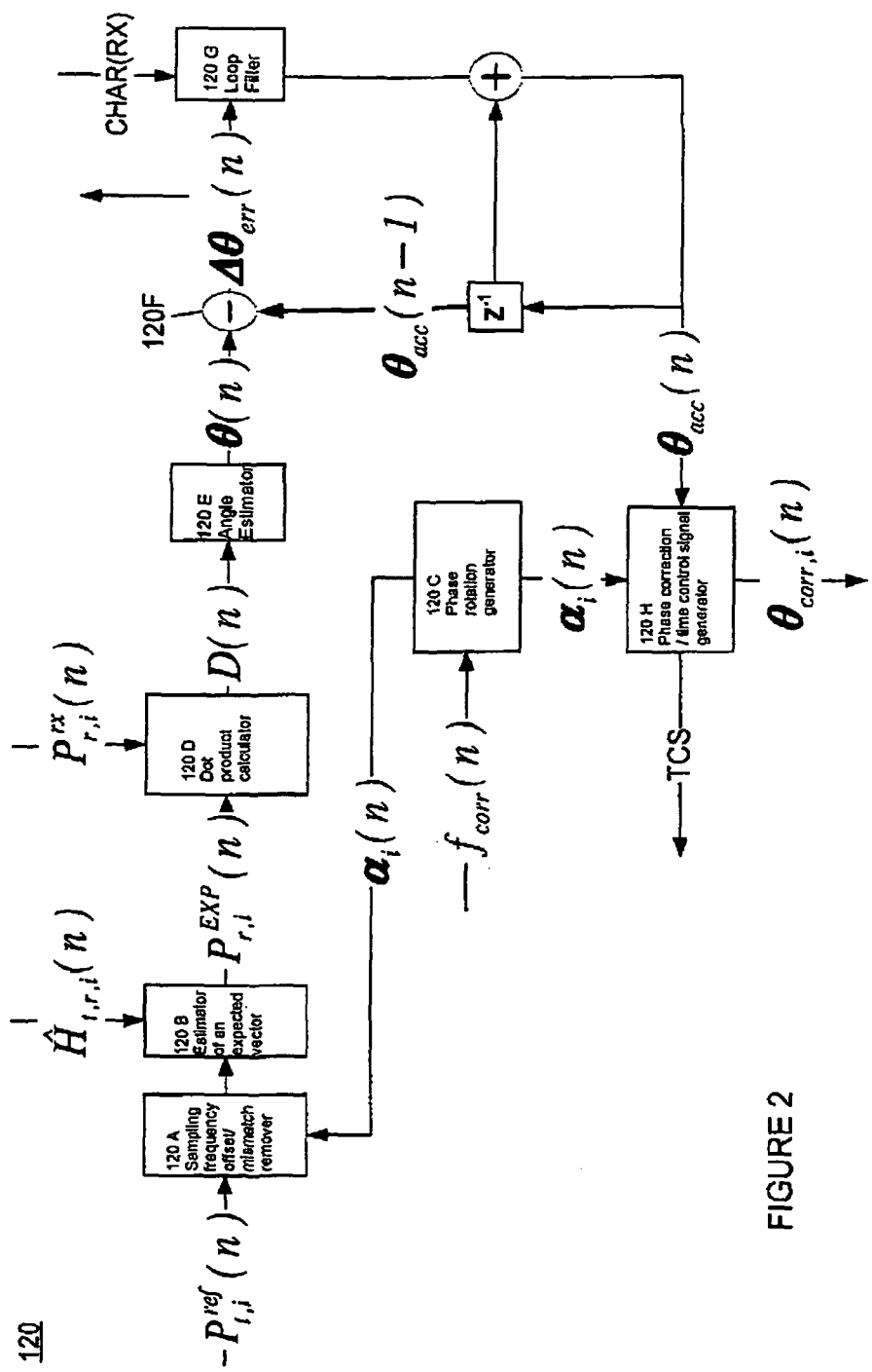
FIG. 2 is a block diagram illustrating an apparatus in accordance with a first exemplary embodiment of the present invention, for estimating a residual frequency error.

Referring now to FIG. 2 there is illustrated the apparatus 120 for estimating a residual frequency error according to a first exemplary embodiment of the present invention. As mentioned above, the subcarrier demultiplexer 110 is configured to demultiplex received subcarriers that are required by apparatus 120 for estimating the residual frequency error. In FIG. 2 and according to the first exemplary embodiment of the present invention, the received subcarriers that are required for estimating the residual frequency error, comprises an actual received vector denoted here $P_{r,i}^{rx}$ where $i \in \{1, 2, \ldots, N_{sc}\}$ represents a subcarrier index and $r \in \{1, 2, \ldots, N_{rx}\}$ represents a receiver chain index. An additional input to apparatus 120 further comprises a channel estimate vector denoted $\hat{H}_{t,r,i}$ where $t \in \{1, 2, \ldots, N_{tx}\}$ represents a transmitter chain index; $r \in \{1, 2, \ldots, N_{rx}\}$ represents a receiver chain index, and $i \in \{1, 2, \ldots, N_{sc}\}$ represents a subcarrier index of an OFDM signal (not shown). The channel estimate vector $\hat{H}_{t,r,i}$ is determined by the channel estimator (CH.EST.) 10 previously depicted in FIG. 1. Another input to apparatus 120 comprises a reference vector denoted here $P_{t,i}^{ref}$. The reference vector $P_{t,i}^{ref}$ is determined by the multiplexer 14 of FIG. 1.

According to an embodiment of the present invention, the reference vector $P_{t,i}^{ref}$ may comprise predefined subcarriers such as transmitted pilot subcarriers that are known to the receiver. According to another embodiment of the present invention, the reference vector $P_{t,i}^{ref}$ may be based on analyzing the received signal or may be based on the inherent characteristics of the received OFDM signal e.g. on the cyclic prefix (CP). The present invention is therefore not restricted to the use of a reference vector based only on transmitted pilot subcarriers.

It is well-known in the art that the presence of a residual frequency error/mismatch may depend on several factors such as the channel (SNR and delay spread) and the amount of impairments in the system (phase noise, phase and amplitude imbalance, DC offset, crystal tolerance etc). Therefore, the actual received vector $P_{r,i}^{rx}$ is generally a function of the residual frequency mismatch denoted $f_{residual}$; the actual channel $H_{t,r,i}(n)$ on the $i^{th}$ subcarrier index for the $n^{th}$ symbol time, the reference vector $P_{t,i}^{ref}(n)$ for the $n^{th}$ symbol time and the noise $W_{r,i}(n)$, which corresponds to an Additive White Gaussian Noise (AWGN) for a $r^{th}$ receive branch on the $i^{th}$ subcarrier in the $n^{th}$ symbol time. The actual received vector $P_{r,i}^{rx}$ for the $n^{th}$ symbol time can be defined according to the following equation:

$$P_{r,i}^{rx}(n) = \sum_{t=1}^{N_{tx}} H_{t,r,i}(n) P_{t,i}^{ref}(n) e^{2\pi n f_{residual}} + W_{r,i}(n) \qquad (1)$$

In equation (1) the residual frequency error is assumed to be the same for all receiver branches. It should be noted that the reference vector $P_{t,i}^{ref}(n)$ may be viewed as one of the selected subcarriers on the $t^{th}$ transmitter branch in the $i^{th}$ subcarrier index for the $n^{th}$ symbol time.

Referring back to FIG. 2 and according to the first embodiment of the present invention, apparatus 120 comprises means 120A for removing a sampling frequency mismatch/ offset (or sampling phase offset) prior to the determination of the residual frequency error. Apparatus 120 further comprises means 120B for estimating, for selected subcarriers of a received symbol, an expected vector, denoted here as $P_{r,i}^{EXP}$, based on the channel estimate vector $\hat{H}_{t,r,i}$ and on the reference vector $P_{t,i}^{ref}$. The expected vector is estimated according to the following equation:

$$P_{r,i}^{EXP}(n) = \sum_{t=1}^{N_{tx}} \hat{H}_{t,r,i}(n) P_{t,i}^{ref}(n) \qquad (2)$$

According to an embodiment of the present invention, the sampling frequency offset (or sampling phase offset) can be removed from the expected vector $P_{r,i}^{EXP}$ given in equation (2). According to another embodiment, the sampling frequency offset can be removed from the received vector $P_{r,i}^{rx}$. According to yet another embodiment of the present invention, the sampling frequency offset can be removed from the reference vector $P_{t,i}^{ref}$. According to a further embodiment of the present invention, the sampling frequency offset can be removed from the channel estimate vector $\hat{H}_{t,r,i}$. The operation of removing the sampling frequency phase mismatch is performed by a phase rotation given by:

$$\alpha_i(n) = 2\pi n i \left(\frac{T_s}{T_u}\right) \frac{a}{1+a} \qquad (3)$$

where i is a subcarrier index, n is a symbol number counted from when the original channel estimate was estimated, a is given by $f_{corr}(n)/F_c$, where $f_{corr}(n)$ is a latest estimate of a frequency mismatch between the transmitted signal and the received signal and $F_c$ is a current channel centre frequency, $T_s$ is the symbol period and $T_u$ is a period of the signal window. In FIG. 2, means 120C is configured to generate $\alpha_i(n)$. It should be noted that an estimate of a frequency mismatch is also used as an input to means 120C. This is illustrated in FIG. 1 by the input denoted $f_{est}$. Note that initially (i.e. when n=1) the value of $f_{corr}$ is $f_{est}$.

Note also that in case the centre frequency of the transmitter and the receiver and the symbol frequency clock frequency are derived from a same reference (crystal) oscillator, the sampling frequency mismatch can be calculated using the total frequency estimate, between the transmitter and the receiver. This can be the case in WLAN standards IEEE 802.11 and IEEE802.16. The sampling frequency mismatch in parts per million (ppm) can then be given by $a=f_{corr}(n)/F_c$.

According to the first embodiment of the present invention, after removal of the sampling frequency offset, the received vector given by equation (1) and the estimated expected vector given by equation (2) are used to calculate a dot product providing a complex number which comprises an amount of phase rotation that the $n^{th}$ OFDM symbol has experienced. The dot product is estimated using equation (5) below:

$$D(n) = \sum_{r=1}^{N_{rx}} \sum_{i} P_{r,i}^{EXP*}(n) P_{r,i}^{rx}(n) \qquad (4)$$

where * is the complex conjugation operator. In FIG. 2, means 120D is configured to calculate the dot product given by equation (4).

According to the first embodiment of the present invention, an estimate of the residual frequency error is determined based on the dot product given in equation (4). First, an angle $\theta(n)$ of the dot product $D(n)$, is estimated by means 120E. Note that the dot product inherently weights the subcarriers phase estimates with the term including the actual and estimated channel $H\hat{H}^*$. Thereafter a change in angle $\Delta\theta_{err}(n)$ is calculated by subtracting, in means 120F, the previous accumulated phase angle, $\theta_{acc}(n-1)$, from the angle of the dot product, $\theta(n)$. A residual frequency estimate is then determined based on the change in angle. The change in angle denoted above $\Delta\theta_{err}(n)$ is calculated according to equation (5) below:

$$\Delta\theta_{err}(n) = \angle\left(\sum_{r=1}^{N_{rx}} \sum_{i} P_{r,i}^{rx}(n) P_{r,i}^{EXP*}(n)\right) - \theta_{acc}(n-1) \qquad (5)$$
$$= \angle(D(n)) - \theta_{acc}(n-1)$$
$$= \theta(n) - \theta_{acc}(n-1)$$

An estimate of the residual frequency error for a $r^{th}$ receiver branch can, according to the present embodiment, be given by: $\Delta\theta_{err,r}(n) = 2\pi n \hat{f}_{residual,r}$.

If the receiver system of FIG. 1 is instead comprised of $N_{rx}$ receiver branches where $N_{rx} \geq 2$ then the residual frequency estimate can be improved by taking the mean value of the individual residual frequency estimates, i.e.

$$f_{residual} = \frac{1}{N_{rx}} \sum_{r=1}^{N_{rx}} \hat{f}_{residual,r} \text{ OR} \qquad (6)$$
$$\Delta\theta_{err}(n) = \frac{1}{N_{rx}} \sum_{r=1}^{N_{rx}} \Delta\theta_{err,r}$$

According to an embodiment of the present invention, the residual frequency error $f_{residual}$ can be estimated by converting the change in angle $\Delta\theta_{err}(n)$ into frequency. The change in angle from apparatus 120 may therefore be used as an input to the phase/angle-to-frequency converter 130 of FIG. 1.

Figure 3A:
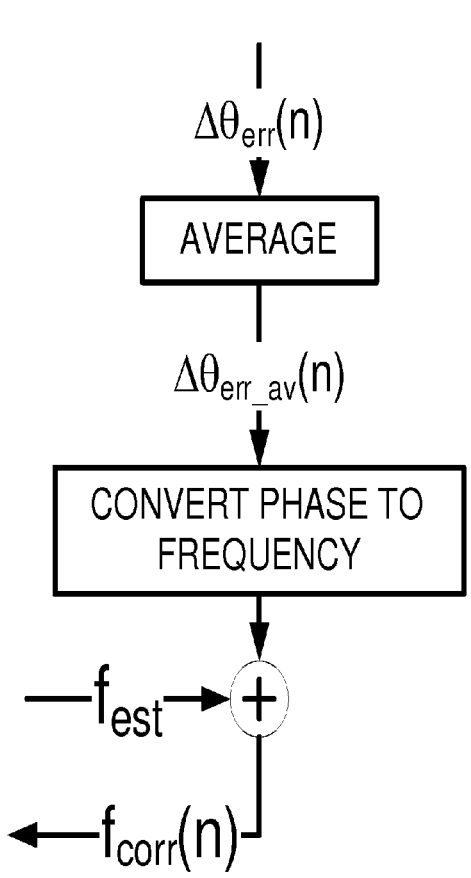
FIGS. 3A and 3B illustrate block diagrams of exemplary phase-to-frequency converters suitable for use in an apparatus of embodiments of the present invention.
Figure 3B:
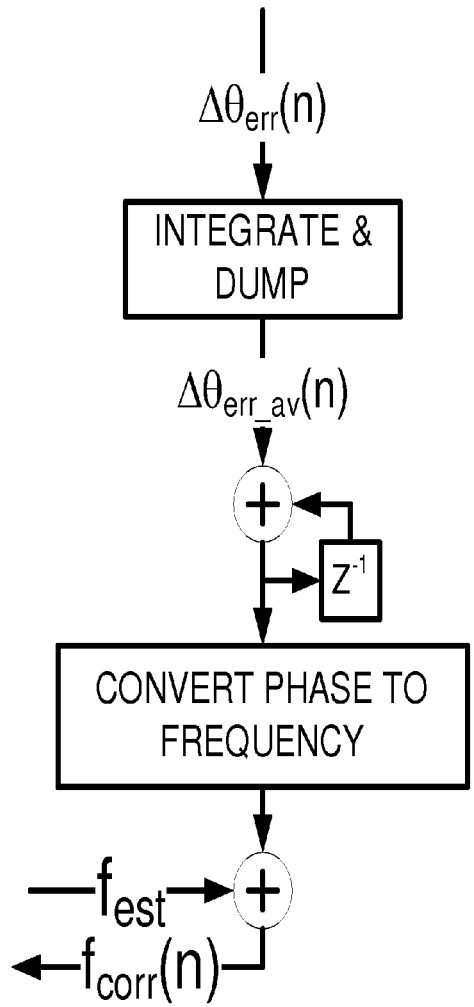

FIG. 3A and FIG. 3B illustrate two examples of a phase/angle-to-frequency converter 130 having as inputs the change in angle $\Delta\theta_{err}(n)$ and a frequency estimate $f_{est}$, and outputting an estimate of a total frequency estimate, $f_{corr}=f_{est}+f_{residual}$. In FIG. 3A, the converter represents an open loop angle-to-frequency converter, where $f_{corr}$ is only used in the next iteration performed in apparatus 120, whereas in FIG. 3B, the converter corresponds to a closed-loop angle-to-frequency converter, where $f_{corr}$ is used in the next iteration performed in apparatus 120 and also to adjust the frequency offset by means of the digital frequency synthesizer 9 or the analog frequency synthesize 6 or the crystal oscillator controller 11.

Referring back to FIG. 2, there is depicted an additional input to apparatus 120, which represents a characteristic of the received signal. The characteristic of the received signal, denoted CHAR(Rx), is according to an embodiment of the present invention, the signal to noise ratio (SNR) of the received signal. According to another embodiment of the present invention CHAR(Rx) may be a delay spread of the channel or the subcarrier constellation e.g. the size of the constellation or any other characteristic of the received signal.

According to the first embodiment of the present invention, apparatus 120 further comprises a feedback system comprising a loop filter 120G that is adaptive based on CHAR(Rx). The feedback system including the loop filter 120G may be used for improving the estimate of the residual frequency mismatch which is further used to adjust the total frequency estimate and/or the initial frequency estimate, and/or the crystal oscillator 8 of the receiver of FIG. 1 and/or the digital frequency synthesizer 9 and/or the analogue frequency synthesizer 6 or any other means.

According to the first embodiment of the present invention, the adaptive loop filter 120G has in addition to the characteristic of the receive signal (CHAR(Rx)), e.g. the SNR, also the change in angle $\Delta\theta_{err}(n)$ from means 120F as input. The output from the loop filter 120G is a filtered change in angle. It should be mentioned that at low SNR, the loop filter 120G, which has the effect of reducing the noise of the residual frequency error estimate, can achieve a damped system having a loop gain set less than 1, whereas at high SNR, the loop gain can be set to 1 thus achieving a critically damped system. The adaptive loop filter 120G of the present invention may be configured as a lowpass filter of FIR (finite impulse response) or IIR (infinite impulse response) filter type or any other suitable adaptive loop filter type.

Referring back to FIG. 2, there is depicted means 120H which is configured to receive the amount of phase rotation $\alpha_i(n)$ generated by means 120C and further configured to output $\theta_{corr,i}(n)$, which according to the present embodiment, represents a phase correction that is applied to all data subcarriers in a period of the current symbol n. $\theta_{corr,i}(n)$ is calculated as the sum of the filtered change in angle $\Delta\theta_{err}(n)$ and a phase that is caused by the presence of a sampling frequency mismatch. This operation is performed for each subcarrier. Means 120H is further arranged to generate a time control signal (TCS) which is transmitted to the advance/retard block 13 of the receiver of FIG. 1.

As mentioned earlier, once the residual frequency error is estimated using the apparatus 120 as described above in conjunction with the first embodiment of the present invention, it is added to a frequency estimate $f_{est}$ to generate a total frequency correction $f_{corr}$. The correction can be applied in a receiver incorporating apparatus 120 such as the receiver shown in FIG. 1. The correction can be applied to the receiver:

At its source—by adjusting the crystal oscillator 8 by increasing or decreasing the receiver frequency to correspond to the transmitter frequency.

By adjusting the digital frequency synthesizer 9 and/or the analogue frequency synthesiser 6, so that the receiver frequency is increased or decreased to correspond to the transmitter frequency.

By removing the phase rotation after the FFT.

Figure 4:
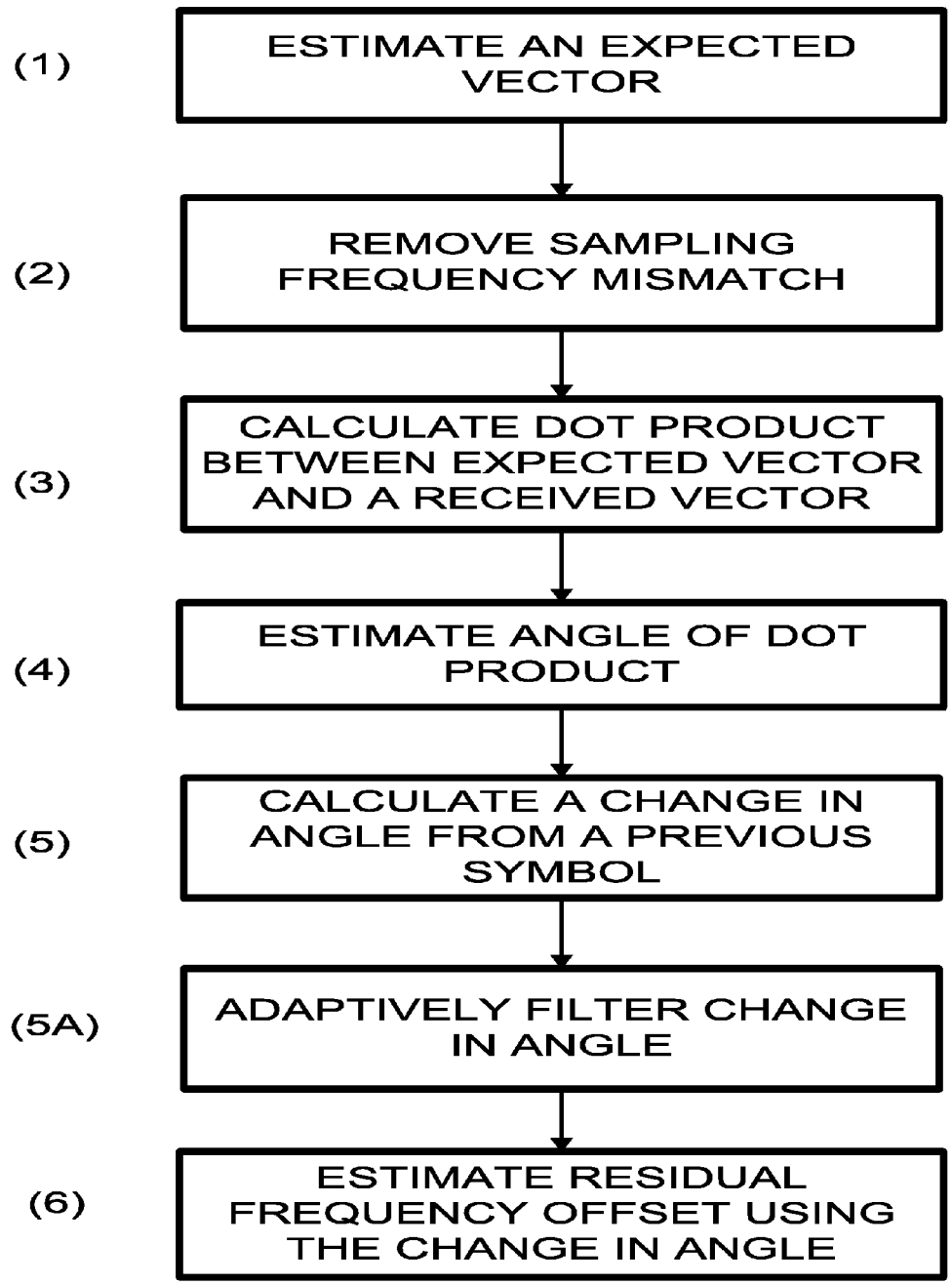
FIG. 4 illustrates a flow chart of a method for estimating a residual frequency error according to the first exemplary embodiment of the present invention.

Referring to FIG. 4 there is illustrated a flowchart comprising the main steps of a method for estimating a residual frequency error according to the previously described first embodiment of the present invention.

In step (1), an expected vector is estimated based on a channel estimate vector and on a reference vector.

In step (2), a sampling frequency mismatch is removed, by phase rotation.

In step (3), a dot product of the estimated expected vector and a received vector, is estimated/calculated.

In step (4), an angle of the resulting product is estimated.

In step (5), a change in angle from the accumulated phase of a previous symbol is calculated.

In step (5A), filtering the change in angle in an adaptive filter wherein at least one coefficient of the filter is a function of the SNR of the received signal.

In step (6), an estimate of a residual frequency error is determined based on the change in angle from the previous symbol.

Figure 5:
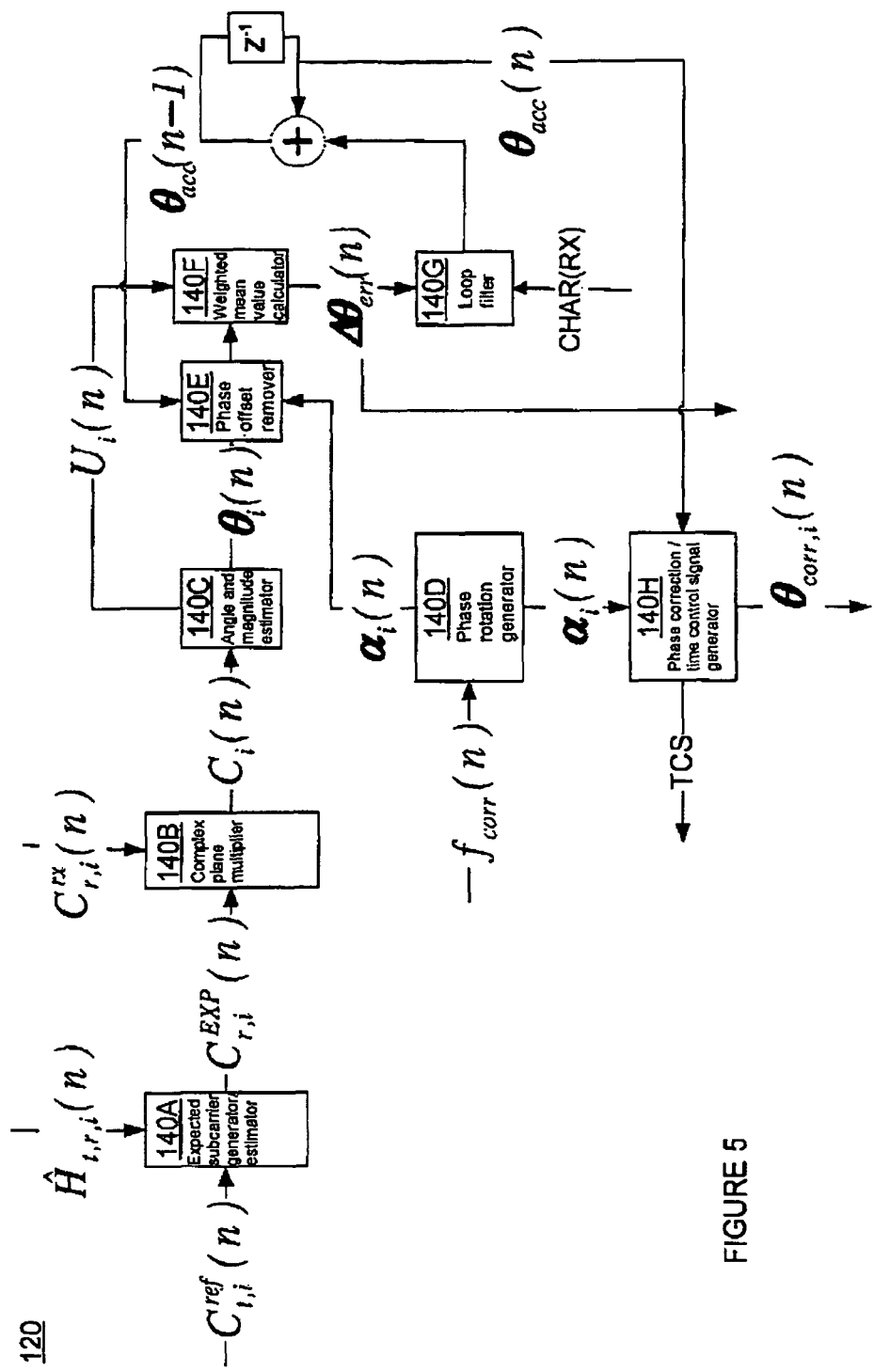
FIG. 5 is a block diagram illustrating an apparatus in accordance with a second exemplary embodiment of the present invention, for estimating a residual frequency error.

Referring to FIG. 5, there is illustrated an apparatus 120 for estimating a residual frequency error in accordance with a second exemplary embodiment of the present invention. In this second exemplary embodiment of the present invention, apparatus 120 comprises means 140A for generating/estimating an expected subcarrier, denoted $C_{r,i}^{EXP}(n)$, based on a channel estimate $\hat{H}_{t,r,i}(n)$ of the subcarrier determined by the channel estimator (CH.EST.) 10 depicted in FIG. 1 and based on a reference subcarrier $C_{t,i}^{ref}(n)$ determined by the multiplexer 14 shown in FIG. 1. The expected subcarrier $C_{r,i}^{EXP}(n)$ can be estimated according to the following equation.

$$C_{r,i}^{EXP}(n) = \sum_{t=1}^{N_{tx}} \hat{H}_{t,r,i}(n) C_{t,i}^{ref}(n) \qquad (7)$$

Similarly to the previous embodiment, the reference subcarrier may be a transmitted pilot subcarrier that is known to the receiver or may be based on analyzing received subcarriers of the received signal or may be based on other inherent characteristic(s) of the received subcarriers.

As shown in FIG. 5, an additional input to apparatus 120 comprises an actual received subcarrier denoted $C_{r,i}^{rx}(n)$ which is a function of the reference subcarrier $C_{t,i}^{ref}(n)$; a residual frequency mismatch $f_{residual}$; an actual channel $H_{t,r,i}(n)$ and the noise $W_{r,i}(n)$ which is defined as Additive White Gaussian Noise (AWGN) for a $r^{th}$ receive branch on the $i^{th}$ subcarrier in the $n^{th}$ symbol time. The received subcarrier can be expressed according to equation (8) below:

$$C_{r,i}^{rx}(n) = \sum_{t=1}^{N_{tx}} H_{t,r,i}(n) C_{t,i}^{ref}(n) e^{2\pi n f_{residual}} + W_{r,i}(n) \qquad (8)$$

In equation (8), the residual frequency error $f_{residual}$ is assumed to be the same for all receiver branches.

According to the second embodiment of the present invention, apparatus 120 further comprises means 140B that is adapted to receive the estimated expected subcarrier $C_{r,i}^{EXP}(n)$ generated by means 140A and to multiply it, in the complex plane, with the received subcarrier given by equation (8). The product denoted $C_i(n)$ that is output from means 140B is expressed in equation (9) below:

$$C_i(n) = \sum_{r=1}^{N_{rx}} C_{r,i}^{EXP*}(n) C_{r,i}^{rx}(n) \qquad (9)$$

Note that in equation (9), a summing over r receive branches is also performed. The value of $C_i(n)$ provides a complex number per subcarrier wherein each contain an amount of phase rotation that the specified subcarrier i within a $n^{th}$ OFDM symbol have experienced.

By substituting equations (7) and (8) into equation (9), $C_i(n)$ can be expressed according to the following equation:

$$C_i(n) = \sum_{r=1}^{N_{rx}} \left[ \sum_{t=1}^{N_{tx}} \hat{H}_{t,r,i}(n) C_{t,i}^{ref}(n) \right]^*$$  (10)

$$\left[ \sum_{t=1}^{N_{tx}} H_{t,r,i}(n) C_{t,i}^{ref}(n) e^{2\pi n f_{residual}} + W_{r,i}(n) \right]$$

$$= \left( \sum_{r=1}^{N_{rx}} e^{2\pi n f_{residual}} \left( \sum_{t=1}^{N_{tx}} H_{t,r,i}(n) C_{t,i}^{ref}(n) \right) \right.$$

$$\left. \left( \sum_{t=1}^{N_{tx}} \hat{H}_{t,r,i}^*(n) C_{t,i}^{ref*}(n) \right) + N_i(n) \right)$$

where the noise term $N_i(n)$ is a function of $W_{r,i}(n)$ according to:

$$N_i(n) = \sum_{r=1}^{N_{rx}} \left( W_{r,i}(n) \sum_{t=1}^{N_{tx}} \hat{H}_{t,r,i}^*(n) C_{t,i}^{ref*}(n) \right).$$

According to the second embodiment of the present invention, an estimate of the residual frequency error is determined based on $C_i(n)$. In order to estimate the residual frequency error, apparatus 120 comprises means 140C having as input $C_i(n)$ and as outputs both an estimation, for each subcarrier, of an angle of $C_i(n)$ and an estimation of a magnitude of $C_i(n)$. Means 140C estimates the magnitude of $C_i(n)$, for subcarrier i according to the following expression (11):

$$U_i(n) = \left| \sum_{r=1}^{N_{rx}} \left( \sum_{t=1}^{N_{tx}} \left( H_{t,r,i}(n) \hat{H}_{t,r,i}^*(n) \left| C_{t,i}^{ref}(n) \right|^2 \right) \right) + N_i(n) \right|$$  (11)

Means 140C further estimates the angle of $C_i(n)$, for subcarrier i, using the following expression (12):

$$\theta_i(n) = \angle \left\{ \sum_{r=1}^{N_{rx}} \left( \sum_{t=1}^{N_{tx}} \left( H_{t,r,i}(n) \hat{H}_{t,r,i}^*(n) \left| C_{t,i}^{ref}(n) \right|^2 \right) \right) + N_i(n) \right\}$$  (12)

It should be noted that means 140C for estimating the angle and the magnitude of $C_i(n)$, has an accuracy that could take any value between 0 to 360 degrees. Therefore, the present invention is not restricted to small angles. According to the present invention, means 140C can be implemented using e.g. a CORDIC (coordinate rotation digital computer) algorithm or hardware multipliers; table-lookup methods and power series expansion techniques or any other suitable means for the determination of the angle and the magnitude of $C_i(n)$.

According to the second embodiment of the present invention, an accumulated phase offset and a phase offset caused by the presence of a sampling frequency mismatch is, for each subcarrier, removed from the output from means 140C i.e. from the estimated angle $\theta_i(n)$ to produce a change in angle between subsequent symbols for each subcarrier, $\Delta\theta_{err,i}(n)$. In apparatus 120, means 140E is configured to perform a phase offset removal caused by the presence of the sampling frequency mismatch. The amount of phase rotation is generated by means 140D. The amount of phase rotation was previously given in equation (3) and is repeated here:

$$a_i(n) = 2\pi n i \left( \frac{T_s}{T_u} \right) \frac{a}{1+a}$$  (13)

where i is a subcarrier index, n is a symbol number counted from when the original channel estimate was estimated, a is given by $f_{corr}(n)/F_c$, where $f_{corr}(n)$ is a latest estimate of a frequency mismatch between the transmitted signal and the received signal and $F_c$ is a current channel centre frequency, $T_s$ is the symbol period and $T_u$ is a period of the signal window.

In FIG. 5, means 140E is configured to remove the phase offset caused by the presence of a sampling frequency mismatch.

It should be noted that the accumulated phase offset and sampling frequency offset between the transmitter and the receiver, can be removed by subtracting them from the estimated angle $\theta_i(n)$. Alternatively, both offsets can be removed instead either by rotating the expected subcarrier or by rotating the actual received subcarrier or by rotating the subcarrier channel estimate or by rotating the reference subcarrier.

According to the second embodiment of the present invention, apparatus 120 of FIG. 5 further comprises means 140F for calculating a weighted mean value of the change in angle between subsequent symbols for each subcarrier, $\Delta\theta_{err}(n)$, according to the following equation:

$$\Delta\theta_{err}(n) = \frac{\left[ \sum_i \angle\{C_i(n)\} U_i(n) \right]}{\sum_i U_i(n)}$$  (14)

where the magnitude $U_i(n)$ of $C_i(n)$, for each subcarrier and for all receiver branches was previously presented in equation (11). A change in weighted mean angle from a previous symbol is calculated and similarly to the previously described first embodiment of the present invention, an estimate of the residual frequency error can be estimated using the following equation:

$$2\pi n \hat{f}_{residual} = \Delta\theta_{err}(n)$$  (15)

Furthermore, the residual frequency error can be estimated by converting $\Delta\theta_{err}(n)$ into frequency using any one of the previously described angle/phase-to-frequency converters illustrated in FIGS. 3A and 3B. The estimated residual frequency error $f_{residual}$ is then added to a frequency estimate $f_{est}$ generated by the time and frequency synchroniser 12 of FIG. 1 in order to determine a total frequency estimate according to: $f_{corr} = f_{est} + f_{residual}$. Similarly to the previously described first embodiment of the present invention, the residual frequency error may further be used to adjust the initial frequency estimate, and/or a crystal oscillator 8 of the receiver and/or a digital frequency synthesizer 9 and/or an analogue frequency synthesizer 6 or any other means.

Referring back to FIG. 5, there is depicted an additional input to apparatus 120, representing a characteristic of the received signal. The characteristic of the received signal, denoted, CHAR(Rx) is, according to an embodiment of the present invention, the signal to noise ratio (SNR). According to another embodiment of the present invention CHAR(Rx) may be a delay spread of the channel or the subcarrier constellation e.g. the size of the constellation or any other characteristic of the received signal. Similarly to the previously described first embodiment of the present invention, apparatus 120 further comprises a feedback system comprising a loop filter 140G that is adaptive based on CHAR(Rx). The feedback system including the loop filter 140G may be used for improving the estimate of the residual frequency mismatch which is further used to adjust the total frequency estimate and/or the initial frequency estimate, and/or a crystal oscillator 8 of the receiver and/or a digital frequency synthesizer 9 and/or an analogue frequency synthesizer 6 or any other means. Thus, once the residual frequency error is estimated using the apparatus 120 as described above in conjunction with the second embodiment of the present invention, it is added to a frequency estimate to generate a total frequency correction $f_{corr}$. The correction can be applied in a receiver incorporating apparatus 120 such as the receiver shown in FIG. 1. Also here, the correction can be applied to the receiver:

- At its source—by adjusting the crystal oscillator 8 by increasing or decreasing the receiver frequency to correspond to the transmitter frequency.
- By adjusting the digital frequency synthesizer 9 and/or the analogue frequency synthesiser 6, so that the receiver frequency is increased or decreased to correspond to the transmitter frequency.
- By removing the phase rotation after the FFT.

According to the second embodiment of the present invention, the adaptive loop filter 140G has as inputs, the characteristic of the received signal, e.g. the SNR, and the change in weighted mean angle between successive symbols i.e. $\Delta\theta_{err}(n)$ and outputs a filtered change in angle. At low SNR, the loop filter 140G, which has the effect of reducing the noise in the change in angle estimate, can achieve a damped system having a loop gain set less than 1, whereas at high SNR, the loop gain can be set to 1 thus achieving a critically damped system.

According to the second embodiment of the present invention, the filtered change in angle is accumulated and added to a phase caused by the presence of a sampling frequency mismatch, for each subcarrier, which gives a phase correction $\theta_{corr,i}(n)$ generated by means 140H, and that is applied to all data subcarriers in a period of the current symbol. Means 140H is further arranged to generate a time control signal (TCS) which is transmitted to the advance/retard block 13 of the receiver of FIG. 1. According to an embodiment of the present invention, the accumulated filtered change in angle can be subtracted from the weighted mean angle. According to another embodiment, the accumulated filtered change in angle can be subtracted from the angle between the estimated expected subcarrier and the received subcarrier. According to another embodiment, the accumulated filtered change in angle can be removed by phase rotation, from the received subcarrier or from the estimated expected vector or from the reference subcarrier or from the channel estimated vector.

Figure 6:
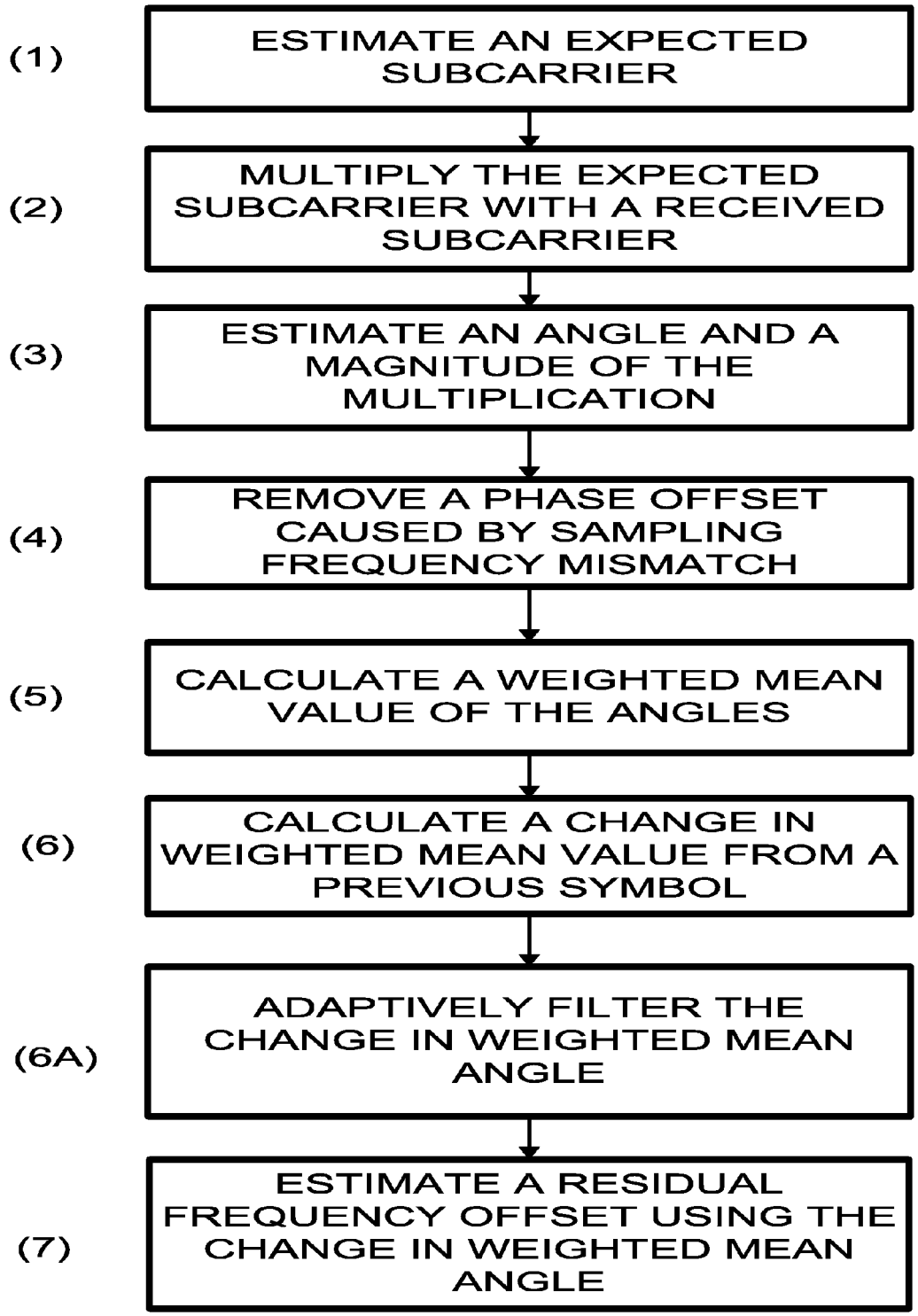
FIG. 6 illustrates a flowchart of a method for estimating a residual frequency error according to the second exemplary embodiment of the present invention.

Referring to FIG. 6, there is illustrated in a flowchart the main steps of a method for estimating a residual frequency error according to the above described second embodiment of the present invention.

In step (1), an expected subcarrier is estimated based on a reference subcarrier and on a channel estimate of the subcarrier;

In step (2), the estimated expected subcarrier is multiplied, in the complex plane, for each subcarrier, with a received subcarrier;

In step (3), an angle and magnitude of the multiplication performed in step 2 are estimated;

In step (4), a phase offset caused by a sampling frequency mismatch is removed;

In step (5), a weighted mean value of the estimated angles is calculated;

In step (6), a change in weighted mean angle from a previous symbol is calculated;

In step (6A), filtering the change in weighted mean angle in an adaptive filter wherein at least one coefficient of the filter is a function of the characteristic of the received signal e.g. the SNR of the received signal.

Figure 7:
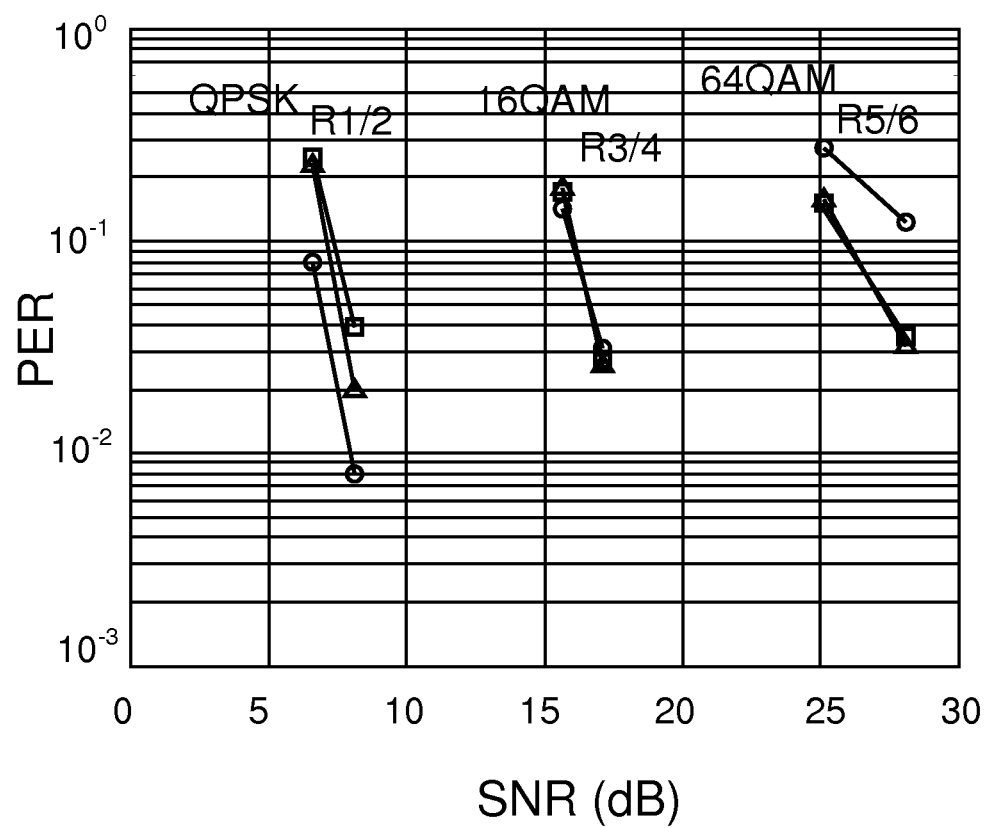
FIG. 7 illustrates the performance improvement provided by the present invention contra prior art.

In step (7), a residual frequency error is estimated based on the change in weighted mean angle. Referring to FIG. 7, there is illustrated the packet error rate (PER) performance using an apparatus according to a prior art solution with a weighting function, based on the channel estimate squared, of $$U_{r,i}(n) = \left| \sum_{t=1}^{N_{tx}} \left( \hat{H}_{t,r,i}(n) \hat{H}_{t,r,i}^*(n) \left| C_{t,i}^{ref}(n) \right|^2 \right) + N_{r,i}(n) \right|$$

and a fixed loop gain of 1 (square), versus the PER performance using an apparatus 120 according the second exemplary embodiment of the present invention with weighting function, based on the actual and estimated channel, of $$U_{r,i}(n) = \left| \sum_{t=1}^{N_{tx}} \left( H_{t,r,i}(n) \hat{H}_{t,r,i}^*(n) \left| C_{t,i}^{ref}(n) \right|^2 \right) + N_{r,i}(n) \right|$$

and a fixed loop gain of 1 (triangle) or 0.5 (circle). To observe the performance of the system over a range of SNRs, three different modulation techniques have been used QPSK, 16 QAM and 64 QAM with three coding rates R1/2, R3/4 and R5/6. It can be seen from FIG. 7 that for low SNR and a loop gain equal to 0.5, the apparatus according to the second embodiment of the present invention (circle) gives an improvement of 1 dB over prior art (square) at a PER=3%. It can also be seen from FIG. 7, when the SNR is large (e.g. SNR>20 dB), the apparatus according to the second embodiment of the present invention (circle) with a fixed loop gain of 0.5 has worse performance than prior art. However, since the embodiments of the present invention involve the use of an adaptive loop filter, then the loop gain could be increased to a gain of 1 when the SNR, a characteristic of the received signal by denoted CHAR(Rx), is greater than e.g. 20 dB.

In addition, the estimation of a residual frequency error according to the previously described embodiments of the present invention, does not discard subcarrier information based on a threshold i.e. it does not suffer from a threshold effect, rather it weights the subcarrier with a value proportional to the actual and estimated channels, $H\hat{H}^*$. Furthermore, the present invention takes into consideration the sampling frequency mismatch in both non-flat fading channels and flat fading channels. Yet another advantage with the present invention is that it is not restricted to small phases or angles i.e. an improvement in accuracy is achieved since an accurate phase estimate of the angle can take any value between 0 and 360 degrees, not just small angles as is the case in the prior art solutions.

A person skilled in the art appreciates that the different embodiments of the present invention can be realised in many ways. The apparatus 120 can e.g. be realised in hardware with means of digital circuits or as software in a signal processing circuit. In addition, apparatus 120 may include the phase/angle to frequency converter(s) shown in FIGS. 3A-3B. Furthermore, apparatus 120 can be implemented in a MIMO OFDM receiver such as the receiver of FIG. 1 which can comprise any number of transmit and receive antennas. The apparatus 120 can also be implemented in a SISO OFDM receiver or any other OFDM system such as WLAN (Wireless Local Area Network) systems, IEEE 802.11 (Institute of Electrical and Electronics Engineers) systems, WiFi (Wireless Fidelity), WiMAX (Worldwide Interoperability for Microwave Access) systems, Wired ADSL; DVB; HDTV; Digital Audi Broadcasting (DAB); Integrated Services Digital Broadcasting; Magic WAND for ATM LANs; Wireless PAN (MB-OFDM); 3GPP & 3GPP2; Long Term Evolution; turbo 3G; Optical OFDM, or any other OFDM based system.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method for estimating a residual frequency error in a Multiple Input Multiple Output (MIMO) Orthogonal Frequency Division Multiplexing (OFDM) receiver, the method comprising:
   (1) estimating, for selected subcarriers of a current symbol of a received signal, an expected vector based on a channel estimate vector and on a reference vector;
   (2) removing, by phase rotation, a sampling frequency mismatch of the reference vector from the expected vector;
   (3) calculating a dot product of the estimated expected vector and a received vector;
   (4) estimating, by an angle estimator, an angle of the calculated dot product;
   (5) calculating a change in angle from an accumulated phase of a previous symbol, based on the estimated angle of the calculated dot product of the current symbol and an estimated angle of a calculated dot product of the previous symbol; and
   (6) estimating the residual frequency error based on the calculated change in angle.

2. The method according to claim 1, further comprising filtering the calculated change in angle by a filter, said filter being adaptive based on at least one characteristic of the received signal.

3. The method according to claim 2, further comprising, for each subcarrier, adding the phase rotation and the filtered change in angle to a phase that is caused by a presence of a sampling frequency mismatch and calculating a phase correction that is applied to all subcarriers of the current symbol.

4. The method according to claim 2,
   wherein at least one coefficient of the filter is a function of a signal to noise ratio (SNR) of said received signal.

5. The method according to claim 2, wherein said expected vector is estimated according to:

$$P_{r,i}^{EXP}(n) = \sum_{t=1}^{N_{tx}} \hat{H}_{t,r,i}(n) P_{t,i}^{ref}(n),$$

where $\hat{H}_{t,r,i}(n)$ is a channel estimate between a $t^{th} \in \{1, \ldots, N_{tx}\}$ transmitter branch and an $i^{th} \in \{1, \ldots, N_{rx}\}$ receiver branch, i is a subcarrier index, $N_{tx}$ is a number of transmitter branches, $N_{rx}$ is a number of receiver branches, and $P_{t,i}^{ref}(n)$ is defined as one of selected subcarriers on a $t^{th}$ transmitter branch in an $i^{th}$ subcarrier index and in a $n^{th}$ symbol time index.

6. The method according to claim 5, wherein said received vector is given according to:

$$P_{r,i}^{rx}(n) = \sum_{t=1}^{N_{tx}} H_{t,r,i}(n) P_{t,i}^{ref}(n) e^{2\pi n f_{residual}} + W_{r,i}(n),$$

where $f_{residual}$ is a residual frequency mismatch for the $i^{th}$ subcarrier index; $H_{t,x,i}(n)$ is an actual channel; $P_{t,i}^{ref}(n)$ is defined as one of said selected subcarriers on the $t^{th}$ transmitter branch in the $i^{th}$ subcarrier index for the $n^{th}$ symbol time index; and $W_{r,i}(n)$ is defined as Additive White Gaussian Noise (AWGN) for an $r^{th}$ receive branch on the $i^{th}$ subcarrier index and in the $n^{th}$ symbol time index.

7. The method according to claim 6, wherein the calculated dot product is calculated according to:

$$D(n) = \sum_{r=1}^{N_{rx}} \sum_{i} P_{r,i}^{EXP*}(n) P_{r,i}^{rx}(n),$$

where * is a complex conjugation operator, said calculated dot product providing a complex number comprising an amount of phase rotation that the $n^{th}$ symbol time index of the received signal has experienced, and
wherein said method further comprises estimating the angle of the calculated dot product, based on said complex number.

8. The method according to claim 7, wherein estimating the residual frequency error further comprises converting the calculated change in angle into a frequency.

9. The method according to claim 1, wherein removing the sampling frequency mismatch is performed using said phase rotation, as given by:

$$a_i(n) = 2\pi n i \left(\frac{T_s}{T_u}\right) \frac{a}{1+a},$$

where i is a subcarrier index, n is a symbol number counted from when an original channel estimate was estimated, and a is given by $f_{corr}(n)/F_c$,
where $f_{corr}(n)$ is a latest estimate of a frequency mismatch between a transmitted signal and a received signal, and $F_c$ is a current channel centre frequency, and
where $T_s$ is a symbol period and $T_u$ is a period of a signal window.

10. A method for estimating a residual frequency error in a Multiple Input Multiple Output (MIMO) Orthogonal Frequency Division Multiplexing (OFDM) receiver, the method comprising:
   (1) estimating, for each subcarrier of a current symbol of a received signal, an expected subcarrier based on a channel estimation of a subcarrier and on a reference subcarrier;
   (2) multiplying in a complex plane, for each subcarrier of the current symbol, the estimated expected subcarrier and a received subcarrier;

(3) estimating, by an angle and magnitude estimator, for each subcarrier of the current symbol, an angle and magnitude of the multiplication performed in the multiplying step;

(4) removing, for each subcarrier of the current symbol, a phase offset caused by a sampling frequency mismatch;

(5) calculating a weighted mean value of the estimated angles and magnitudes from the estimating step;

(6) calculating a change in a weighted mean angle from a previous symbol, based on the calculated weighted mean value of the estimate angles and magnitudes of the current symbol and a calculated weighted mean value of estimate angles and magnitudes of the previous symbol; and (7) estimating the residual frequency error based on the change in the weighted mean angle.

11. The method according to claim 10, further comprising filtering the calculated change in the weighted mean angle by a filter, said filter being adaptive based on at least one characteristic of the received signal.

12. The method according to claim 11, further comprising:
accumulating the filtered change in the weighted mean angle;
adding the accumulated filtered change in the weighted mean angle to a phase that is caused by a presence of a sampling frequency mismatch, for each subcarrier; and
calculating a phase correction that is applied to all subcarriers of the current symbol.

13. The method according to claim 11, wherein at least one coefficient of the filter is a function of a signal to noise ratio (SNR) of said received signal.

14. The method according to claim 13, wherein a loop gain of said filter is adapted based on said at least one coefficient of the filter.

15. The method according to claim 10, wherein said expected subcarrier is estimated according to:

$$C_{r,i}^{EXP}(n) = \sum_{t=1}^{N_{tx}} \hat{H}_{t,r,i}(n) C_{t,i}^{ref}(n),$$

where $\hat{H}_{t,x,i}(n)$ is said channel estimation of the subcarrier, between a $t^{th} \in \{1, \ldots, N_{tx}\}$ transmitter branch and an $r^{th} \in \{1, \ldots, N_{rx}\}$ receiver branch, i is a subcarrier index, $N_{tx}$ is a number of transmitter branches, $N_{rx}$ is a number of receiver branches, and $C_{t,i}^{ref}(n)$ is the reference subcarrier on a $t^{th}$ transmitter branch in the $i^{th}$ subcarrier index and in a $n^{th}$ symbol time index.

16. The method according to claim 15, wherein said received subcarrier is given according to:

$$C_{r,i}^{rx}(n) = \sum_{t=1}^{N_{tx}} H_{t,r,i}(n) C_{t,i}^{ref}(n) e^{2\pi n f_{residual}} + W_{r,i}(n),$$

where $f_{residual}$ is said residual frequency mismatch for the $i^{th}$ subcarrier index, $H_{t,x,i}(n)$ is an actual channel of the subcarrier, $C_{t,i}^{ref}(n)$ is the reference subcarrier on the $i^{th}$ transmitter branch in the $i^{th}$ subcarrier index and in the $n^{th}$ symbol time index and $W_{r,i}(n)$ is defined as Additive White Gaussian Noise (AWGN) for an $r^{th}$ receive branch on the $i^{th}$ subcarrier index and in the $n^{th}$ symbol time index.

17. The method according to claim 16, wherein said step of multiplying further comprises summing over each received signal,
wherein said multiplying and said summing are performed according to:

$$C_i(n) = \sum_{r=1}^{N_{rx}} C_{r,i}^{EXP*}(n) C_{r,i}^{rx}(n)$$

where * is a complex conjugation operator, said multiplying and summing providing a complex number, per subcarrier, comprising an amount of phase rotation that the $n^{th}$ symbol time index of the received signal has experienced,
wherein said method further comprises estimating an angle and magnitude of $C_i(n)$, said magnitude being a function of said actual channel and said channel estimate, and is given by:

$$U_i(n) = \left| \sum_{r=1}^{N_{rx}} \left( \sum_{t=1}^{N_{tx}} \left( H_{t,r,i}(n) \hat{H}_{t,r,i}^*(n) |C_{t,i}^{ref}(n)|^2 \right) \right) + N_i(n) \right|$$

where, $H_{t,x,i}(n)$ is said actual channel of the subcarrier, $\hat{H}_{t,x,i}^*(n)$ is the channel estimate of the subcarrier and $N_i(n)$ is a noise term, and
wherein said angle of $C_i(n)$ is given by:

$$\theta_i(n) = \angle \left\{ \sum_{r=1}^{N_{rx}} \left( \sum_{t=1}^{N_{tx}} \left( H_{t,r,i}(n) \hat{H}_{t,r,i}^*(n) |C_{t,i}^{ref}(n)|^2 \right) \right) + N_i(n) \right\}.$$

18. The method according to claim 17, wherein the step of calculating said weighted mean value of the estimated angles and magnitudes is performed according to:

$$\Delta \theta_{err}(n) = \frac{\left[ \sum_i \angle\{C_i(n)\} U_i(n) \right]}{\sum_i U_i(n)},$$

where $\angle$ is the angle operator used to determine the angle of $C_i(n)$.

19. The method according to claim 18, wherein estimating said residual frequency error further comprises converting said change in the weighted mean angle into a frequency.

20. The method according to claim 10, wherein removing the phase offset is performed by a phase rotation given by:

$$a_i(n) = 2\pi n i \left( \frac{T_s}{T_u} \right) \frac{a}{1+a}$$

where i is a subcarrier index, n is a symbol number counted from when an original channel estimate was estimated, a is given by $f_{corr}(c)/F_c$,
where $f_{corr}(n)$ is a latest estimate of a frequency mismatch between a transmitted signal and a received signal, and $F_c$ is a current channel centre frequency, and where $T_s$ is a symbol period and $T_u$ is a period of a signal window.

21. The method according to claim 20, further comprising removing the phase offset, by the phase rotation, from the estimated angles and magnitudes of the multiplication between the estimated expected subcarrier and the received subcarrier.

22. The method according to claim 20, further comprising removing the phase offset, by the phase rotation, from said received subcarrier.

23. The method according to claim 20, further comprising removing the phase offset, by the phase rotation, from the channel estimation of the subcarrier.

24. The method according to claim 20, further comprising removing the phase offset, by the phase rotation, from the estimated expected subcarrier.

25. The method according to claim 20, further comprising removing the phase offset, by the phase rotation, from said reference subcarrier.

* * * * *

UNITED STATES PATENT AND TRADEMARK OFFICE
CERTIFICATE OF CORRECTION

PATENT NO.       : 8,559,546 B2
APPLICATION NO.  : 12/993394
DATED            : October 15, 2013
INVENTOR(S)      : Scott Leyonhjelm et al.

It is certified that error appears in the above-identified patent and that said Letters Patent is hereby corrected as shown below:

On the title page, Item (54) and in the Specification, Col. 1, Title reads:

"METHODS AND AN APPARATUS FOR ESTIMATING A RESIDUAL FREQUENCY ERROR IN A COMUNICATIONS SYSTEM"

should be

--METHODS AND AN APPARATUS FOR ESTIMATING A RESIDUAL FREQUENCY ERROR IN A COMMUNICATIONS SYSTEM--.

Signed and Sealed this
Eleventh Day of February, 2014

Michelle K. Lee
*Deputy Director of the United States Patent and Trademark Office*